US006965854B2

(12) United States Patent
Cutlip

(10) Patent No.: US 6,965,854 B2
(45) Date of Patent: Nov. 15, 2005

(54) METHODS, SYSTEMS AND COMPUTER PROGRAM PRODUCTS FOR SCREENING SIMULATED TRAFFIC FOR RANDOMNESS

(75) Inventor: Robert Russell Cutlip, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 09/911,107

(22) Filed: Jul. 23, 2001

(65) Prior Publication Data

US 2003/0018458 A1 Jan. 23, 2003

(51) Int. Cl.⁷ .......................... G06F 11/22; G06F 11/30; G06F 15/177
(52) U.S. Cl. .............. 703/21; 703/22; 703/2; 709/220; 709/224; 370/255; 370/412; 702/182; 702/186; 715/736
(58) Field of Search .............. 703/2, 21, 23; 709/220, 224; 370/412, 255; 702/182, 186; 715/736

(56) References Cited

U.S. PATENT DOCUMENTS

| | | | |
|---|---|---|---|
| 5,440,719 A | | 8/1995 | Hanes et al. ............... 395/500 |
| 5,787,253 A | | 7/1998 | McCreery et al. ..... 395/200.61 |
| 5,881,269 A | | 3/1999 | Dobbelstein ................ 395/500 |
| 6,044,398 A | * | 3/2000 | Marullo et al. ............. 709/219 |
| 6,209,033 B1 | | 3/2001 | Datta et al. .................. 709/224 |
| 6,278,966 B1 | * | 8/2001 | Howard et al. ............... 703/23 |
| 6,721,686 B2 | * | 4/2004 | Malmskog et al. ......... 702/186 |
| 6,772,107 B1 | * | 8/2004 | La Cascia, Jr. et al. ...... 703/21 |
| 6,898,564 B1 | * | 5/2005 | Odhner et al. ................ 703/21 |

FOREIGN PATENT DOCUMENTS

| | | |
|---|---|---|
| GB | 2 341 955 A | 3/2000 |
| JP | 11184366 | 7/1999 |
| JP | 200049863 A | 2/2000 |

OTHER PUBLICATIONS

K. Tsuchiya and Y. Takefuji, A Neural Network Parallel Algorithm for Ramsey Numbers, 1992, RNNS/IEEE Symposium on Neuroinformatics and Neurocomputers, vol. 2, pp. 1166–1171.*
A. Gupta, S. Kalyanaraman, L. Zhang; A Two–component Spot Pricing Framework for Loss–rate Guaranteed Internet Service Contracts; 2003; Proceedings of the 2003 Winter Simulation Conference; pp. 372–380.*
Eric W. Weisstein, "Ramsey Number", retrieved on Jan. 14, 2005 from http://mathworld.wolfram.com/RamseyNumber.html.*
Solé and Valarde, "Information transfer and phase transitions in a model of internet traffic," *Physica: Statistical Mechanics and Its Applications*. vol. 289, No. 3–4, Jan. 15, 2001, pp. 595–605.
"Supply Driven Networks," *Research Disclaimer*. Disclosed by International Business Machines Corporation. Sep. 1999.
Radziszowski, et al. "Small Ramsey Numbers," Revision #7, *The Electronic Journal of Combinatorics*. (2000) pp. 1–36.
"Ramsey Number," http://forgodot.new21.org/lecture/graph_theory/contents/Ramsey%20Number.htm. Jul. 12, 2001.

* cited by examiner

*Primary Examiner*—William Thomson
*Assistant Examiner*—Jason Proctor
(74) *Attorney, Agent, or Firm*—Myers Bigel Sibley & Sajovec, P.A.

(57) ABSTRACT

Methods, systems and computer program products are provided for simulating network traffic by filtering simulated network traffic utilizing known Ramsey numbers so as to provide a first predefined number of related messages to simulate buy messages and a second predefined number of unrelated messages to simulate browse messages. The first predefined number may correspond to a clique of order m specified by a selected known Ramsey number and the second predefined number may correspond to an independent set of order n specified by the known Ramsey number.

30 Claims, 5 Drawing Sheets

US 6,965,854 B2

METHODS, SYSTEMS AND COMPUTER PROGRAM PRODUCTS FOR SCREENING SIMULATED TRAFFIC FOR RANDOMNESS

FIELD OF THE INVENTION

The present invention relates to network traffic simulation and, more particularly, network traffic simulation which includes buy and browse behavior.

BACKGROUND OF THE INVENTION

In networked systems, it may be advantageous to simulate network traffic. Conventional network traffic simulation tools exist for providing such simulated traffic. Such simulators are, typically, configured to provide a random stream of network traffic, such as Hypertext Transport Protocol (HTTP) messages which may be bound to a specific network or to other networks.

One potential difficulty in network simulation is if the desired simulation has both related and unrelated traffic. For example, in simulating network traffic related to e-commerce, it may be beneficial to simulate buy behavior and browse behavior. Buy behavior is typically characterized as a series of related network traffic messages or packets and browse behavior is typically characterized as a series of unrelated network traffic messages or packets. Typically, conventional network traffic simulators which generate random streams of messages have difficulty maintaining a random network traffic stream if constrained to provide both buy and browse messages in the network traffic stream.

SUMMARY OF THE INVENTION

Embodiments of the present invention provide methods, systems, and computer program products for simulating network traffic by filtering simulated network traffic utilizing known Ramsey numbers so as to provide a first predefined number of related messages to simulate buy messages and a second predefined number of unrelated messages to simulate browse messages. In particular embodiments of the present invention, the first predefined number corresponds to a clique of order m specified by a selected known Ramsey number and the second predefined number corresponds to an independent set of order n specified by the selected known Ramsey number.

In further embodiments of the present invention, simulated network traffic is generated so as to provide a bundle of messages corresponding to the selected known Ramsey number. In such embodiments, filtering the simulated network traffic may be provided by selecting m related messages from a bundle of messages corresponding to the selected known Ramsey number and by selecting n unrelated messages from the bundle of messages. Furthermore, the selected m related messages may be ordered and chained. The m related messages and the n unrelated messages may also be streamed so as to provide pseudo-Internet traffic.

In still further embodiments of the present invention, the selection of the m related and the n unrelated messages may be monitored to determine if the bundle of messages provides both the m related messages and the n unrelated messages. The generation of the bundles of messages may be modified if monitoring of the selection indicates that the bundle of messages fails to provide both the m related messages and the n unrelated messages. In such embodiments of the present invention, the generation of simulated network traffic may be provided utilizing a plurality of non-linear functions. In such a case, the generation of the bundle of messages may be modified by adding at least one additional non-linear function to the plurality of non-linear functions.

In still further embodiments of the present invention, the monitoring may be provided by monitoring the selection for a plurality of bundles. The modification of the generation of the network traffic may be provided by modifying the generation of the bundles of messages if monitoring of the selection indicates that a plurality of the bundle of messages fails to provide both the m related messages and the n unrelated messages.

In still further embodiments of the present invention, he known Ramsey numbers are known Ramsey numbers and/or Ramsey numbers known within bounds.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
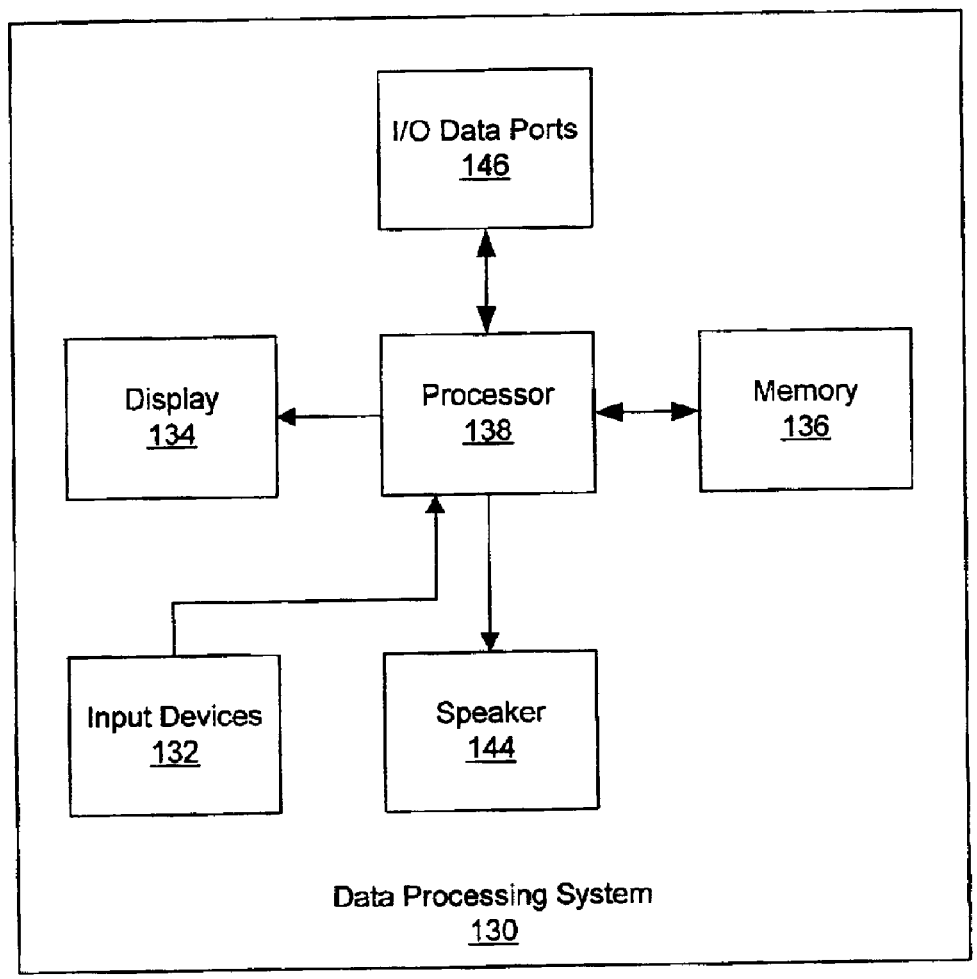
FIG. 1 is a block diagram of a data processing system suitable for use in generating simulated network traffic according to embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention provide for filtering simulated network traffic with known Ramsey numbers so as to simulate buy and browse behavior in the network traffic. Such filtering may potentially provide enhanced randomness of the simulated network traffic. Simulated network traffic is generated and message bundles having a size equal to the Ramsey number for the desired buy/browse behavior to be simulated are generated. From these message bundles, the buy and browse traffic is selected and streamed to represent pseudo-Internet traffic having the desired buy and browse characteristics.

The Ramsey number R(m,n) gives the solution to the Party Problem, which asks the minimum number of guests R(m,n) that must be invited so that at least m will know each other or at least n will not know each other. Stated differently, the Ramsey number is the minimum number of vertices v=R(m,n) such that all unidirected simple graphs of order v contain a clique of order m and an independent set of order n. Ramsey's Theorem states that such a number exists for all m and n.

In the present invention, the clique of order m is considered the buy traffic and the independent set of order n the browse traffic. Some known Ramsey numbers are illustrated in Table 1 below.

TABLE 1

Exemplary Known Ramsey Numbers

| m | n | R(m,n) |
|---|---|--------|
| 3 | 3 | 6 |
| 3 | 4 | 9 |
| 3 | 5 | 14 |
| 3 | 6 | 18 |
| 3 | 7 | 23 |
| 3 | 9 | 36 |
| 4 | 4 | 18 |
| 4 | 5 | 25 |

Additional information on Ramsey numbers, including a summary of known Ramsey numbers, may be found, for example, in Radziszowski et al., "Small Ramsey Numbers", Revision # 7, The Electronic Journal of Combinatorics (2000).

Various embodiments of the present invention will now be described with reference to the figures. FIG. 1 illustrates an exemplary embodiment of a data processing system 130 suitable for simulating network traffic in accordance with embodiments of the present invention. The data processing system 130 typically includes input device(s) 132 such as a keyboard or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 2:
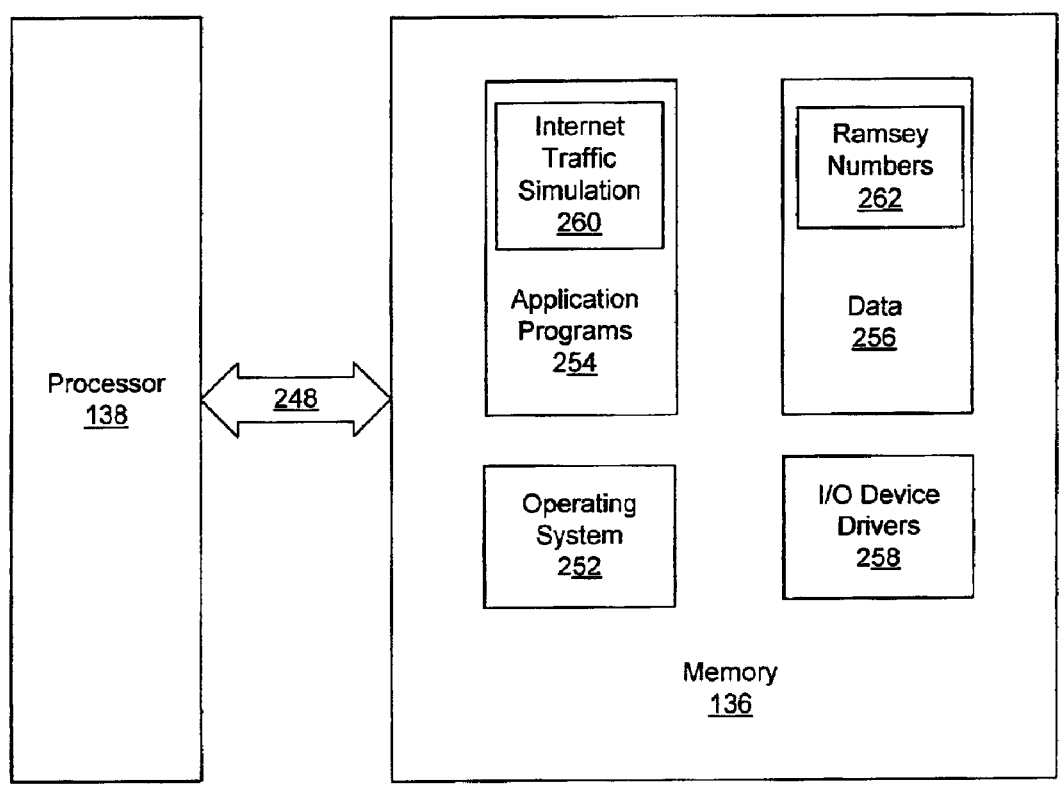
FIG. 2 is a more detailed block diagram of a network traffic simulation system according to embodiments of the present invention.

FIG. 2 is a block diagram of data processing systems that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices containing the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the data processing system 130: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98 or Windows2000 from Microsoft Corporation, Redmond, Wash., Unix or Linux. The I/O device drivers 258 typically include software routines accessed through the operating system 252 by the application programs 254 to communicate with devices such as the I/O data port(s) 146, the data storage 135 and certain memory 136 components. The application programs 254 are illustrative of the programs that implement the various features of the data processing system 130 and preferably include at least one application which supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 2, the application programs 254 may include an Internet traffic simulation module 260. The Internet traffic simulation module 260 may carry out the operations described herein for generating simulated Internet traffic which includes both buying and browsing behavior. The data portion 256 of memory 136, as shown in the embodiments of FIG. 2, may include known Ramsey numbers 262. The known Ramsey numbers 262 may be utilized by the Internet traffic simulation module 260 to filter stochastic and/or chaotic simulated Internet traffic to provide substantially random Internet traffic which includes buy and browse behavior.

While the present invention is illustrated, for example, with reference to the Internet traffic simulation module 260 being an application program in FIG. 2, as will be appreciated by those of skill in the art, other configurations may also be utilized while still benefitting from the teachings of the present invention. For example, the Internet traffic simulation module 260 may also be incorporated into the operating system 252, the I/O device drivers 258 or other such logical division of the data processing system 130. Thus, the present invention should not be construed as limited to the configuration of FIG. 2 but is intended to encompass any configuration capable of carrying out the operations described herein.

Figure 3:
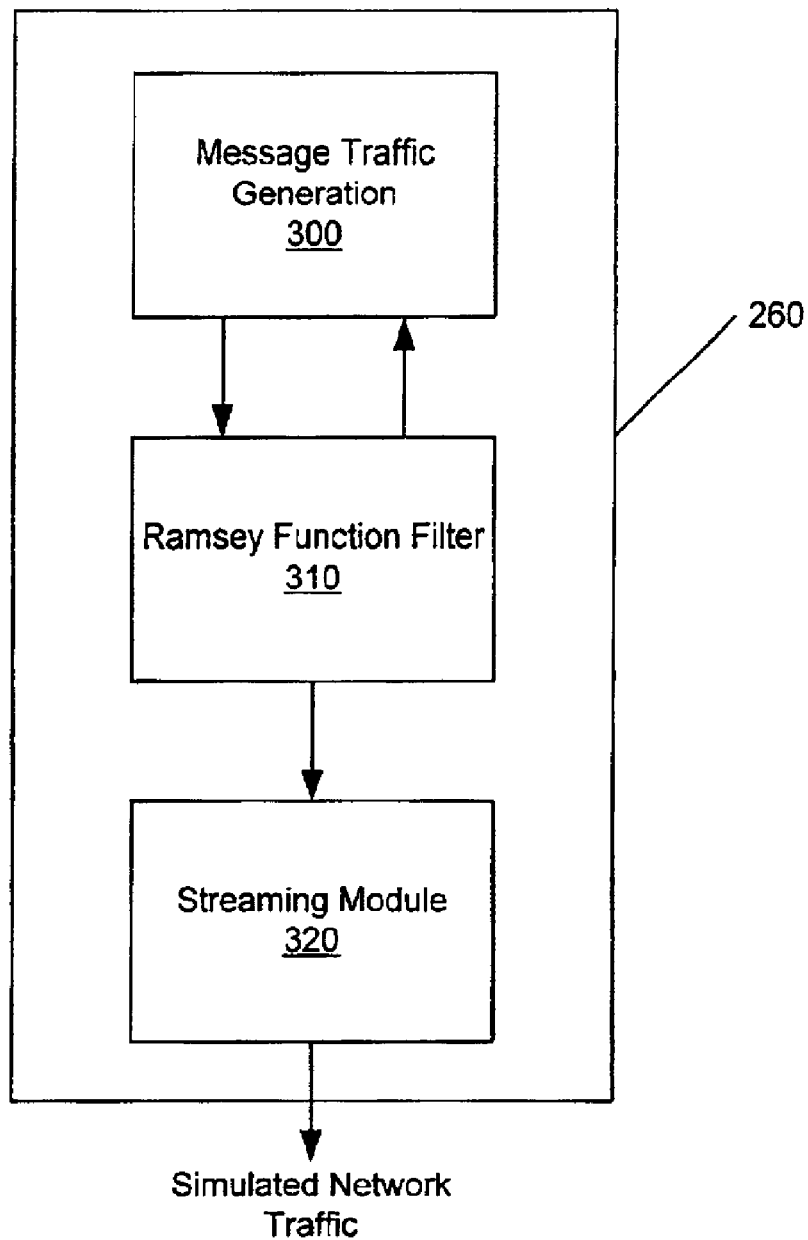
FIG. 3 is a more detailed block diagram of the network traffic simulation module of FIG. 2.

FIG. 3 is a more detailed block diagram of the traffic simulation module 260 of FIG. 2. As seen in FIG. 3, a message traffic generation unit 300 generates message bundles which are provided to a Ramsey function filter 310. The message bundles preferably include R(m,n) messages, however, a stream of messages may be provided and the Ramsey function filter 310 may divide the stream into bundles of R(m,n) messages. The message traffic generation unit 300 may be a set of non-linear functions producing stochastic and/or "chaotic" message traffic. Techniques for generating network traffic will be understood by those of skill in the art in light of the present disclosure and, therefore, will not be described further herein except as they relate to particular aspects of the present invention. The message traffic generated by the traffic generation unit 300 is of a type from within the realm of buy/browse behaviors.

The Ramsey function filter 310 receives the message bundles or message stream from the message traffic generation unit 300 and identifies a clique of order m and an independent set of order n, where m is the number of related e-commerce buy messages needed to complete a particular buy behavior and n is the number of browse messages. The remaining messages in the bundle of messages from the message traffic generation unit 300 may be discarded by the Ramsey function filter 310. The values for m and n may be selected based on a desired and/or expected buy/browse behavior. Selecting the desired buy/browse behavior to be simulated, thus, selects the Ramsey number R(m,n).

Optionally, the Ramsey function filter 310 may provide feedback to the message traffic generation unit 300 so as to adjust the functions of the message traffic generation unit 300 if, for example, the Ramsey function filter 310 is not configured to generate the desired messages from the message bundles provided.

The Ramsey function filter 310 provides the m related messages and the n unrelated messages to the streaming module 320. The streaming module 320 chains and orders the related messages to simulate the buy behavior and streams the related and unrelated messages to represent pseudo-Internet traffic. Such traffic may, for example, be provided to a border router of an e-commerce system so as to simulate buy and browse behavior traffic to the e-commerce system.

Figure 4:
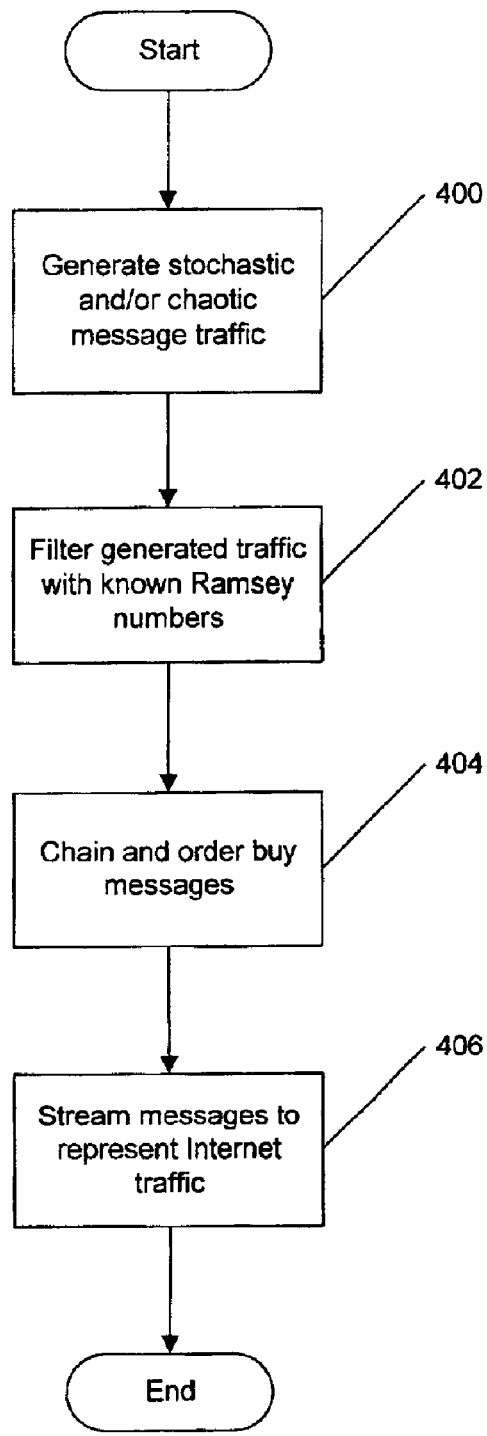
FIG. 4 is a flowchart illustrating operations for network traffic simulation according to embodiments of the present invention.

Operations according to embodiments of the present invention will now be described with reference to the flowcharts of FIGS. 4 and 5. As seen in FIG. 4, stochastic and/or chaotic message traffic is generated (block 400), for example, by the message traffic generation module 300. The generated traffic is filtered utilizing known Ramsey numbers to select from the generated traffic m related messages and n unrelated messages (block 402). For example, message bundles of size R(m,n) can be generated and evaluated so as to select the m related messages and the n unrelated messages. The remaining messages could be discarded. In any event, the m related messages are chained and ordered to simulate the buy messages (block 404) and streamed with the n unrelated messages to represent pseudo-Internet traffic (block 406).

Figure 5:
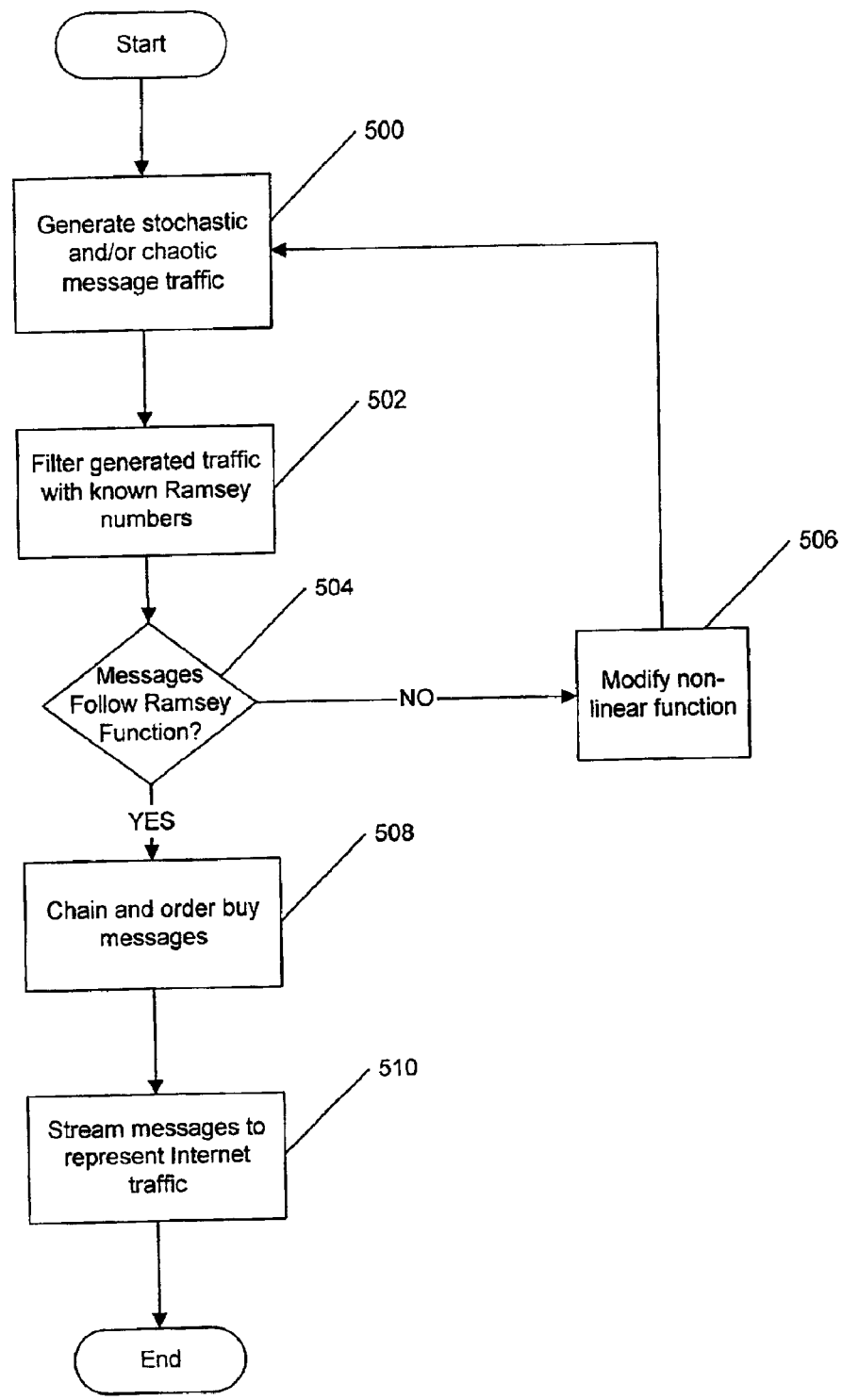
FIG. 5 is a flowchart illustrating operations for network traffic simulation according to further embodiments of the present invention.

FIG. 5 illustrates further embodiments of the present invention which provide feedback to the message traffic generation unit 300 so as to facilitate Ramsey filtering of the generated message traffic. As with the embodiments illustrated in FIG. 4, stochastic and/or chaotic message traffic is generated (block 500), for example, by the message traffic generation module 300. The generated traffic is filtered utilizing known Ramsey numbers to select from the generated traffic m related messages and n unrelated messages (block 502). For example, message bundles of size R(m,n) can be generated and evaluated so as to select the m related messages and the n unrelated messages. The remaining messages could be discarded.

The operation of the Ramsey function filter 310 may be monitored to determine if the messages are following the Ramsey function (e.g., are m related and n unrelated messages present in the R(m,n) bundles of messages) (block 504). If the messages are not satisfying the Ramsey function (block 504), the message traffic generation unit 300 may be modified, for example, by adding one or more additional non-linear functions to the non-linear functions utilized to generate the message traffic (block 506). Additional message traffic is then generated utilizing the modified non-linear functions (block 500). Alternatively, the non-linear functions utilized in message generation could be modifying by revising the existing non-linear functions or replacing the existing non-linear functions utilized with other non-linear functions.

Such monitoring and evaluation of the Ramsey function filtering and feedback for message generation may be performed on each individual message bundle or on a plurality of message bundles. If a single bundle of R(m,n) does not provide messages which satisfy the Ramsey function, multiple bundles could be evaluated to select the m buy messages and n browse messages. The feedback would then, over time, adjust the generation of messages so as to provide messages such that all or substantially all of the message bundles satisfy the Ramsey function.

When messages which satisfy the Ramsey function are available (block 504), the m related messages are chained and ordered to simulate the buy messages (block 508) and streamed with the n unrelated messages to represent pseudo-Internet traffic (block 510).

While the present invention has been described with reference to the use of known Ramsey numbers, as used herein, references to known Ramsey numbers refers to both known Ramsey numbers and Ramsey numbers known within bounds.

The flowcharts and block diagrams of FIGS. 1 through 6 illustrate the architecture, functionality, and operation of possible implementations of systems, methods and computer program products for generating simulated Internet traffic according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of simulating network traffic, comprising:
   filtering simulated network traffic utilizing known Ramsey numbers so as to provide a first predefined number of related messages and a second predefined number of unrelated messages; and
   streaming the related messages and the unrelated messages to provide pseudo-network traffic.

2. The method of claim 1, wherein the first predefined number of related messages simulate buy messages wherein the second predefined number of unrelated messages simulate browse messages.

3. The method of claim 2, wherein the first predefined number of related messages comprises a clique of order m specified by a selected known Ramsey number and the second predefined number of unrelated messages comprises an independent set of order n specified by the known Ramsey number.

4. The method of claim 3, further comprising the step of generating the simulated network traffic so as to provide a bundle of messages corresponding to the selected known Ramsey number.

5. The method of claim 4, wherein the step of filtering comprises the steps of:
   selecting m related messages from the bundle of messages corresponding to the selected known Ramsey number; and
   selecting n unrelated messages from the bundle of messages.

6. The method of claim 5, further comprising the steps of:
   ordering the selected m related messages;
   chaining the selected m related messages; and
   wherein streaming the related messages and the unrelated messages comprises streaming the m related messages and the n unrelated messages so as to provide pseudo-Internet traffic having buy and browse messages.

7. The method of claim 5, further comprising the steps of:
   monitoring the selection of the m related and the n unrelated messages to determine if the bundle of messages provides both the m related messages and then unrelated messages; and
   modifying the generation of the bundles of messages if monitoring the selection indicates that the bundle of messages fails to provide both the m related messages and the n unrelated messages.

8. The method of claim 7, wherein the step of generating simulated network traffic comprises the step of generating simulated network traffic utilizing a plurality of non-linear functions and wherein the step of modifying the generation of the bundle of messages comprises the step of adding at least one additional non-linear function to the plurality of non-linear functions.

9. The method of claim 7, wherein the step of monitoring comprises monitoring the selection for a plurality of bundles and wherein the step of modifying comprises the step of modifying the generation of the bundles of messages if monitoring the selection indicates that a plurality of the bundles of messages fails to provide both the m related messages and the n unrelated messages.

10. The method of claim 1, wherein the known Ramsey numbers comprise at least one of known Ramsey numbers and Ramsey numbers known within bounds.

11. A computer system for simulating network traffic, comprising: means for generating simulated network traffic;
   means for filtering the simulated network traffic utilizing known Ramsey numbers so as to provide a first predefined number of related messages and a second predefined number of unrelated messages.

12. The system of claim 11, wherein the first predefined number of related messages simulate buy messages and a second predefined number of unrelated messages simulate browse messages.

13. The system of claim 12, wherein the first predefined number of related messages comprises a clique of order m specified by a selected known Ramsey number and the second predefined number of unrelated messages comprises an independent set of order n specified by the known Ramsey number.

14. The system of claim 13, wherein the means for generating comprises means for generating simulated network traffic so as to provide a bundle of messages corresponding to the selected known Ramsey number.

15. The system of claim 14, wherein the means for filtering comprises:
   means for selecting m related messages from a bundle of messages corresponding to the selected known Ramsey number; and
   means for selecting n unrelated messages from the bundle of messages.

16. The system of claim 15, further comprising:
   means for ordering the selected m related messages;
   means for chaining the selected m related messages; and
   wherein the means for streaming comprises means for streaming the m related messages and the n unrelated messages so as to provide pseudo-Internet traffic including buy and browse messages.

17. The system of claim 15, further comprising:
   means for monitoring the selection of the m related and the n unrelated messages to determine if the bundle of messages provides both the m related messages and the n unrelated messages; and
   means for modifying the generation of the bundles of messages if monitoring the selection indicates that the bundle of messages fails to provide both the m related messages and the n unrelated messages.

18. The system of claim 17, wherein the means for generating simulated network traffic comprises means for generating simulated network traffic utilizing a plurality of non-linear functions and wherein the means for modifying the generation of the bundle of messages comprises means for adding at least one additional non-linear function to the plurality of non-linear functions.

19. The system of claim 17, wherein the means for monitoring comprises means for monitoring the selection for a plurality of bundles and wherein the means for modifying comprises means for modifying the generation of the bundles of messages if monitoring the selection indicates that a plurality of the bundles of messages fails to provide both the m related messages and the n unrelated messages.

20. The system of claim 12, wherein the known Ramsey numbers comprise at least one of known Ramsey numbers and Ramsey numbers known within bounds.

21. A computer program product for simulating network traffic, comprising:
   a tangible computer readable medium having computer readable program code embodied therein, the computer readable program code comprising:
   computer readable program code which generates simulated network traffic; and
   computer readable program code which filters the simulated network traffic utilizing known Ramsey numbers so as to provide a first predefined number of related messages and a second predefined number of unrelated messages.

22. The computer program product of claim 21, wherein the first predefined number of related messages simulate buy messages and the second predefined number of unrelated messages simulate browse messages.

23. The computer program product of claim 22, wherein the first predefined number of related messages comprises a clique of order m specified by a selected known Ramsey number and the second predefined number of unrelated messages comprises an independent set of order n specified by the known Ramsey number.

24. The computer program product of claim 23, wherein the computer readable program code which generates comprises computer readable program code which generates simulated network traffic so as to provide a bundle of messages corresponding to the selected known Ramsey number.

25. The computer program product of claim 24, wherein the computer readable program code which filters comprises:
   computer readable program code which selects m related messages from a bundle of messages corresponding to the selected known Ramsey number; and
   computer readable program code which selects n unrelated messages from the bundle of messages.

26. The computer program product of claim 25, further comprising:
   computer readable program code which orders the selected m related messages;
   computer readable program code which chains the selected m related messages; and
   wherein the computer readable program code which streams comprises computer readable program code which streams the m related messages and the n unrelated messages so as to provide pseudo-Internet traffic including buy and browse messages.

27. The computer program product of claim 25, further comprising:
   computer readable program code which monitors the selection of the m related and the n unrelated messages to determine if the bundle of messages provides both the m related messages and the n unrelated messages; and
   computer readable program code which modifies the generation of the bundles of messages if monitoring the selection indicates that the bundle of messages fails to provide both the m related messages and the n unrelated messages.

28. The computer program product of claim 27, wherein the computer readable program code which generates simulated network traffic comprises computer readable program code which generates simulated network traffic utilizing a plurality of non-linear functions and wherein the computer readable program code which modifies the generation of the bundle of messages comprises computer readable program code which adds at least one additional non-linear function to the plurality of non-linear functions.

29. The computer program product of claim 27, wherein the computer readable program code which monitors comprises computer readable program code which monitors the selection for a plurality of bundles and wherein the computer readable program code which modifies comprises computer readable program code which modifies the generation of the bundles of messages if monitoring the selection indicates that a plurality of the bundles of messages fails to provide both the m related messages and the n unrelated messages.

30. The computer program product of claim 22, wherein the known Ramsey numbers comprise at least one of known Ramsey numbers and Ramsey numbers known within bounds.

* * * * *

UNITED STATES PATENT AND TRADEMARK OFFICE
CERTIFICATE OF CORRECTION

PATENT NO.    : 6,965,854 B2
DATED         : November 15, 2005
INVENTOR(S)   : Robert Cutlip It is certified that error appears in the above-identified patent and that said Letters Patent is hereby corrected as shown below:

Column 8,
Line 26, delete "computer" between "A" and "system".
Line 31, after "messages" insert -- ; and means for streaming the related messages and the unrelated messages to provide pseudo-network traffic --.

Column 9,
Line 19, delete "tangible" between "a" and "computer".
Line 28, after "messages" insert -- ; and computer readable program code which streams the related messages and the unrelated messages to provide pseudo-network --.

Signed and Sealed this

Twenty-first Day of February, 2006

JON W. DUDAS
*Director of the United States Patent and Trademark Office*